United States Patent [19]

Inagaki et al.

[11] 4,346,837
[45] Aug. 31, 1982

[54] THERMOSTAT FOR CONTROLLING THE FLOW OF COOLING WATER OF AN ENGINE

[75] Inventors: Masao Inagaki, Okazaki; Shigeru Sato, Togoshi, both of Japan

[73] Assignees: Toyota Jidosha K.K., Toyota; Fuji-Thomson Co., Ltd., Togoshi, both of Japan

[21] Appl. No.: 228,733

[22] Filed: Jan. 27, 1981

[30] Foreign Application Priority Data

Jan. 29, 1980 [JP] Japan ............... 55/8458[U]

[51] Int. Cl.³ ............................................. F01P 7/02
[52] U.S. Cl. ................................ 236/34.5; 236/100; 277/157
[58] Field of Search ............ 236/100, 99 K, 34, 34.5; 277/102, 149, 151, 157; 267/134, 163; 60/527

[56] References Cited

U.S. PATENT DOCUMENTS

| | | | |
|---|---|---|---|
| 432,717 | 7/1890 | Adams et al. | 277/102 |
| 1,674,256 | 6/1928 | Nelson | 277/157 X |
| 1,822,722 | 9/1931 | Bell | 277/157 X |
| 2,793,889 | 5/1957 | Potter, Jr. | 277/102 X |
| 3,120,272 | 2/1964 | Cochran | 277/102 X |
| 3,588,126 | 6/1971 | McKillop et al. | 277/102 X |
| 4,058,084 | 11/1977 | Kawaguchi et al. | 277/102 X |
| 4,175,696 | 11/1979 | Braukmann | 236/34.5 |

Primary Examiner—William E. Tapolcai, Jr.
Attorney, Agent, or Firm—Kenyon & Kenyon

[57] ABSTRACT

A thermostat comprising a valve and a wax container connected to the valve. A drive rod projects from the end face of the wax container and is connected to the casing of the thermostat. The drive rod is actuated by the expanding operation of the wax contained in the wax container. A hollow cylindrical sealing sleeve is arranged on the end face of the wax container and has a hole through which the drive rod passes. A plurality of triangular shaped projections is formed on the inner wall of the hole of the sealing sleeve. A spring cap is fitted onto the sealing sleeve for pressing the triangular shaped projections onto the drive rod due to the spring force of the spring cap.

11 Claims, 6 Drawing Figures

U.S. Patent   Aug. 31, 1982   Sheet 1 of 2   4,346,837
Fig. 1
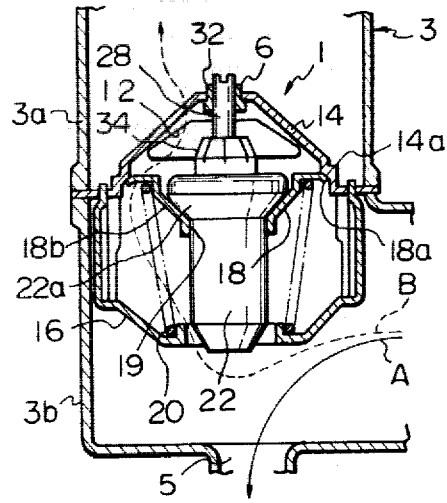
Fig. 2
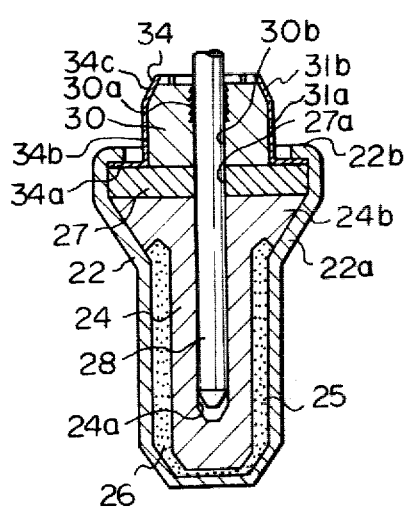
Fig. 3

THERMOSTAT FOR CONTROLLING THE FLOW OF COOLING WATER OF AN ENGINE

DESCRIPTION OF THE INVENTION

The present invention relates to a thermostat arranged in the cooling water passage connecting the water jacket of an engine body to the radiator of an engine.

The thermostat normally comprises a wax container arranged to be exposed to the cooling water, an elastic material fitted into the wax container, and a drive rod inserted into the central hole of the elastic material so as to slide therein. A space is formed between the elastic material and the wax container and filled with a thermal sensitive wax which is expansible when the temperature of the cooling water exceeds a predetermined temperature. The projecting tip of the drive rod is supported by the housing of the thermostat, and the wax container has a valve normally closing the cooling water passage. When the temperature of the cooling water exceeds a predetermined temperature, the drive rod is pushed out from the wax container due to the expanding operation of the wax and, as a result, the valve is opened. In a conventional thermostat, a hollow sealing sleeve is inserted onto the drive rod and fixed onto the wax container, and a plurality of triangular shaped projections is formed on the inner wall of the center hole of the sealing sleeve so that they contact the drive rod to prevent the cooling water from entering into the clearance formed between the bottom of the central hole in the elastic material and the innermost tip of the drive rod. However, in the case wherein such a conventional thermostat is used for a long time, since the triangular shaped projections wear and deteriorate, the contacting force of the triangular shaped projections, which acts on the outer wall of the drive rod, becomes weak. As a result of this, the cooling water enters into the central hole in the elastic material via the clearance between the sealing sleeve and the drive rod and is confined within the clearance between the bottom of the central hole in the elastic material and the innermost tip of the drive rod. However, in the case wherein the cooling water is confined as mentioned above, when the expanding operation of the wax is started, the drive rod is pushed out excessively by a length which is proportional to the volume of the cooling water confined within the central hole in the elastic material. As a result of this, since the opening operation of the valve is started before the temperature of the cooling water reaches a predetermined temperature, a problem occurs in that it is impossible to obtain optimum temperature control of the cooling water.

An object of the present invention is to provide a thermostat capable of starting the opening operation of the valve when the temperature of the cooling water reaches a predetermined temperature, even if the thermostat is used for a long time.

According to the present invention, there is provided a thermostat arranged in a coolant passage of an internal combustion engine, said thermostat comprising a casing stationarily arranged in the coolant passage, a valve which normally shuts off the coolant passage, a wax container which contains therein an expansible wax sensitive to temperature and is connected to the valve, and a drive rod which has an inner portion slidably inserted into the wax container and has an outer portion projecting outwardly from an end face of said wax container and connected to the casing, the drive rod projecting due to the expanding operation of the wax for actuating the valve to open the coolant passage when the temperature of the coolant reaches a predetermined temperature, the improvement wherein said thermostat comprises a sealing sleeve made of an elastic material and having a hole through which the drive rod passes, and a generally hollow cylindrical spring cap enclosing said sealing sleeve and contacting an outer circumferential wall of said sealing sleeve for pressing an inner wall of the hole of said sealing sleeve onto the drive rod due to the spring force of said spring cap.

The present invention may be more fully understood from the description of preferred embodiments of the invention set forth below, together with the accompanying drawings.

BRIEF DESCRIPTION OF THE DRAWINGS

In the drawings:

FIG. 1 is a cross-sectional side view of an embodiment of a thermostat according to the present invention;

FIG. 2 is a cross-sectional side view of the wax container illustrated in FIG. 1;

FIG. 3 is a side view of the spring cap illustrated in FIG. 2;

DESCRIPTION OF PREFERRED EMBODIMENTS

Figure 4:
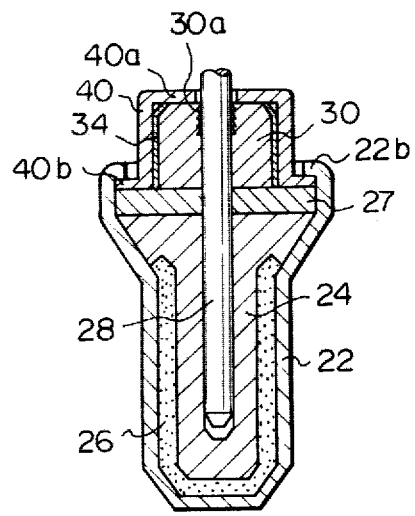
FIG. 4 is a cross-sectional side view of another embodiment of a wax container according to the present invention.

Referring to FIG. 1, a thermostat, generally designated by reference numeral 1, is arranged in a cooling water pipe 3 which comprises a pair of pipe sections 3a, 3b. The pipe section 3a is connected to the radiator (not shown) of an engine, and the pipe section 3b is connected to the water jacket of an engine body (not shown). In addition, a bypass passage 5 is provided for connecting the interior of the pipe section 3b to the suction side of the water pump (not shown). As illustrated in FIG. 1, the thermostat 1 comprises an upper casing 14 having apertures 12 and supported by the pipe 3, and a lower casing 16 rigidly connected to the upper casing 14. A valve 18 is arranged within the casings 14, 16 and comprises a horizontally extending annular portion 18a and an outwardly slanted portion 18b. A compression spring 20 is inserted between the valve 18 and the lower casing 16 so that the outer periphery of the annular portion 18a is normally seated on a valve seat portion 14a of the upper casing 14. There is a central opening 19 between the two portions of the valve 18, and a wax container 22 is fitted into the central opening 19 so that the outwardly slanted portion 22a of the wax container 22 abuts against the outwardly slanted portion 18b of the valve 18.

As illustrated in FIG. 2, an elastic material 24, such as rubber, conforming to the shape of the wax container 22 and having an enlarged head portion 24b, is fitted into the wax container 22 so that the outer circumferential wall of the enlarged head portion 24b comes into contact with the inner wall of the outwardly slanted portion 22a of the wax container 22. The outwardly slanted upper portion 22a of the wax container 22 becomes straight-sided and then bends inward at a right angle to form a short horizontal portion 22b. A flat seat plate 27, made of a metallic material, is inserted just under the short horizontal portions 22b and abuts the straight-sided section of the wax container 22. In addition, a space 25 is formed in the lower portion between the elastic material 24 and the wax container 22 and is filled with a thermal sensitive wax 26. A central hole 24a is formed in the elastic material 24 and, also, a central hole 27a, which is aligned with the central hole 24a, is formed in the seat plate 27. The lower end of a drive rod 28 is slidably inserted into the central holes 27a, 24a, and a supporting member 32, shown in FIG. 1, is fixed onto the top end of the drive rod 28. The supporting member 32 is secured onto the upper casing 14 and, therefore, the drive rod 28 is stationarily supported by the upper casing 14. FIGS. 1 and 2 illustrate the case wherein the temperature of the cooling water located around the wax container 22 is lower than a predetermined temperature. At this time, as illustrated in FIG. 1, the outer periphery of the annular portion 18a of the valve 18 abuts against the valve seat portion 14a of the upper casing 14 due to the spring force of the compression spring 20 and, thus, the valve 18 is closed. At this time, the cooling water, flowing into the pipe section 3b from the water jacket of the engine (not shown), is returned to the water jacket via the bypass passage 5 as illustrated by the arrow A in FIG. 1. On the other hand, when the temperature of the cooling water located around the wax container 22 exceeds the predetermined temperature, in FIG. 2, the expanding operation of the wax 26 is started. When the wax 26 expands, since the elastic material 24 is compressed, the force acts on the drive rod 28, causing the drive rod 28 to move upwards. At this time, since the drive rod 28 is secured onto the upper casing 14 via the supporting member 32, in FIG. 1, the wax container 22 moves downward against the spring force of the compression spring 20. As a result of this, since the annular portion 18a moves away from the valve seat portion 14a of the upper casing 14, the valve 18 is opened. At this time, the cooling water in the pipe section 3b flows into the pipe section 3a via the valve 18 as illustrated by the arrow B in FIG. 1 and then is fed into the radiator (not shown).

As illustrated in FIG. 2, a sealing sleeve 30, made of an elastic material such as rubber, is arranged on the top face of the seat plate 27. The sealing sleeve 30 has an axially extending central hole 30b, and the drive rod 28 passes through the central hole 30b. A plurality of triangular shaped projections 30a is formed on the inner wall of the central hole 30b and sealingly engages the outer wall of the drive rod 28 to prevent the cooling water from entering into the clearance between the drive rod 28 and the elastic material 24. The sealing sleeve 30 has a flat top face and a flat bottom face contacting the top face of the seat plate 27. In addition, the sealing sleeve 30 has a cylindrical outer circumferential wall portion 31a and an inwardly slanted outer circumferential wall portion 31b above the portion 31a. As illustrated in FIGS. 1 and 2, a spring cap 34, made of a metallic material, is fitted over the sealing sleeve 30. As illustrated in FIGS. 2 and 3, the spring cap 34 has on its bottom end an outwardly radially extending annular flange 34a formed in one piece thereon, and the annular flange 34a is inserted between the top face of the seat plate 27 and the short horizontal portion 22b of the wax container 22. The spring cap 34 comprises a cylindrical portion 34b contacting the cylindrical outer circumferential wall 31a of the sealing sleeve 30, and an inwardly slanted portion 34c contacting the inwardly slanted outer circumferential wall 31b of the sealing sleeve 30. As illustrated in FIG. 3, a plurality of axially extending slots 35 is formed on the spring cap 34. Each of the slots 35 extends over the entire length of the inwardly slanted portion 34c and terminates at the central portion of the cylindrical portion 34b. When the spring cap 34 is fitted onto the sealing sleeve 30 as illustrated in FIG. 2, tongue portions 36 (FIG. 3), each being formed between the adjacent slots 35, are elastically deformed outward and, as a result, the triangular shaped projections 30a are pressed onto the outer wall of the drive rod 28 due to the spring force of the tongue portions 36.

In the thermostat 1 as illustrated in FIGS. 1 and 2, the upward movement and the downward movement of the drive rod 28 are repeated. Consequently, if the thermostat 1 is used for a long time, since the triangular shaped projections 30a wear and deteriorate, the contacting force of the triangular shaped projections 30a, which acts on the outer wall of the drive rod 28, becomes weak. However, in the present invention, since the triangular shaped projections 30a are pressed onto the outer wall of the drive rod 28 due to the spring force of the tongue portions 36 of the spring cap 34, even if the triangular shaped projections 30a wear and deteriorate, an appropriate contacting force between the triangular shaped projections 30a and the outer wall of the drive rod 28 is maintained. Therefore, since it is possible to prevent the cooling water from accumulating in the clearance between the lower end of the drive rod 28 and the bottom of the central hole 24a of the elastic material 24, it is possible to start the opening operation of the valve 18 when the temperature of the cooling water reaches a predetermined temperature, even if the thermostat 1 is used for a long time.

Figure 5:
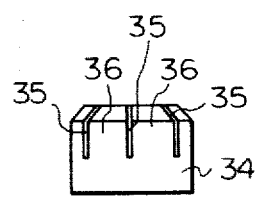
FIG. 5 is a side view of the spring cap illustrated in FIG. 4.

FIG. 4 illustrates another embodiment. In this embodiment, as in the same manner as described with reference to FIG. 2, the triangular shaped projections 30a are pressed onto the outer wall of the drive rod 28 due to the spring force of the tongue portions 36 (FIG. 5) of the spring cap 34. However, in this embodiment, the spring cap 34 has no flange, as illustrated in FIG. 3, and the spring cap 34 is supported by a metallic cover 40 surrounding the spring cap 34. This cover 40 comprises an annular upper flange 40a extending towards the drive rod 28 and terminating in the vicinity of the drive rod 28, and an outwardly radially extending annular lower flange 40b inserted between the top face of the flat seat plate 27 and the short horizontal portion 22b of the wax container 22.

Figure 6:
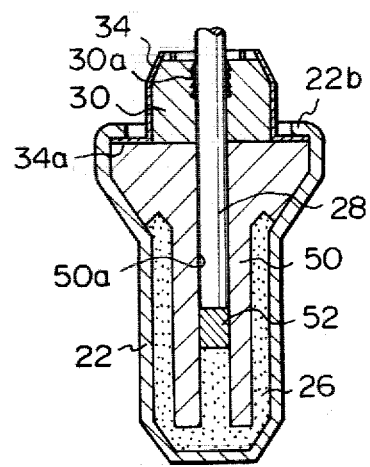
FIG. 6 is a cross-sectional side view of a further embodiment of a wax container according to the present invention.

FIG. 6 illustrates a further embodiment. In this embodiment, instead of using the elastic material 24 illustrated in FIGS. 2 and 4, a metallic sleeve 50 is fitted into the wax container 22. The sleeve 50 has a central through-hole 50a, and the drive rod 28 is slidably inserted into the through-hole 50a. A spacer 52, made of a rubber material, is slidably inserted into the through-hole 50a, and the through-hole 50a, located below the spacer 52, is filled with the wax 26. Consequently, the expanding operation of the wax 26 is transferred to the drive rod 28 via the spacer 52. The spring cap 34, illustrated in FIG. 6, has a construction which is the same as that illustrated in FIGS. 2 and 3, and the annular flange 34a of the spring cap 34 is supported between the top face of the sleeve 50 and the short horizontal portions 22b of the wax container 22.

While the invention has been described by reference to specific embodiments chosen for purposes of illustration, it should be apparent that numerous modifications could be made thereto by those skilled in the art without departing from the basic concept and scope of the invention.

We claim:

1. A thermostat arranged in a coolant passage of an internal combustion engine, said thermostat comprising a casing stationarily arranged in the coolant passage, a valve which normally shuts off the coolant passage, a wax container which contains therein an expansible wax sensitive to temperature and is connected to the valve, and a drive rod which has an inner portion slidably inserted into the wax container and has an outer portion projecting outwardly from an end face of said wax container and connected to the casing, the drive rod projecting due to the expanding operation of the wax for actuating the valve to open the coolant passage when the temperature of the coolant reaches a predetermined temperature, the improvement wherein said thermostat comprises a sealing sleeve made of an elastic material and having a hole through which the drive rod passes, and a generally hollow cylindrical spring cap enclosing said sealing sleeve and contacting an outer circumferential wall of said sealing sleeve for pressing an inner wall of the hole of said sealing sleeve onto the drive rod due to the spring force of said spring cap, the inner wall of the hole of said sealing sleeve having a plurality of triangular shaped projections formed thereon at a position remote from the end face of the wax container, and said sealing sleeve having an inwardly slanted circumferential wall located around said triangular shaped projections, said spring cap having a resilient inwardly slanted portion which resiliently contacts the inwardly slanted outer circumferential wall of said sealing sleeve for pressing said triangular shaped projections onto the drive rod due to the resilient force of said resilient inwardly slanted portion.

2. A thermostat as claimed in claim 1, wherein said sealing sleeve is made of a rubber material.

3. A thermostat as claimed in claim 1, wherein said spring cap has a resilient inwardly slanted portion located remote from the end face of the wax container for pressing the inner wall of the hole of said sealing sleeve, which is located remote from the end face of the wax container, onto the drive rod.

4. A thermostat as claimed in claim 3, wherein a plurality of axially extending slots is formed on the resilient inwardly slanted portion of said spring cap.

5. A thermostat as claimed in claim 1, wherein said spring cap has an outwardly radially extending annular flange fixed onto the end face of the wax container for supporting said sealing sleeve on the end face of the wax container.

6. A thermostat as claimed in claim 5, wherein the wax container has a short horizontal portion inwardly radially extending and engaging the annular flange of said spring cap for fixing said spring cap onto the end face of the wax container.

7. A thermostat as claimed in claim 1, wherein said thermostat comprises a generally hollow cylindrical cover fixed onto the end face of the wax container and enclosing said spring cap for supporting said sealing sleeve and said spring cap on the end face of the wax container.

8. A thermostat as claimed in claim 7, wherein said cover comprises an outwardly radially extending first flange and an inwardly radially extending second flange engaging an end face of said sealing sleeve, which is located opposite to the end face of the wax container, the wax container having a short horizontal portion which inwardly radially extends and engages the first flange of of said cover for fixing said cover onto the end face of the wax container.

9. A thermostat as claimed in claim 1, wherein said spring cap is made, in one piece, of a resilient material.

10. A thermostat arranged in a coolant passage of an internal combustion engine, said thermostat comprising a casing stationarily arranged in the coolant passage, a valve which normally shuts off the coolant passage, a wax container which contains therein an expansible wax sensitive to temperature and is connected to the valve, and a drive rod which has an inner portion slidably inserted into the wax container and has an outer portion projecting outwardly from an end face of said wax container and connected to the casing, the drive rod projecting due to the expanding operation of the wax for actuating the valve to open the coolant passage when the temperature of the coolant reaches a predetermined temperature, the improvement wherein said thermostat comprises a sealing sleeve made of an elastic material and having a hole through which the drive rod passes, and a generally hollow cylindrical spring cap enclosing said sealing sleeve and contacting an outer circumferential wall of said sealing sleeve for pressing an inner wall of the hole of said sealing sleeve onto the drive rod due to the spring force of said spring cap, said spring cap having a resilient inwardly slanted portion located remote from the end face of the wax container for pressing the inner wall of the hole of said sealing sleeve, which is located remote from the end face of the wax container, onto the drive rod.

11. A thermostat as claimed in claim 10, wherein a plurality of axially extending slots is formed on the resilient inwardly slanted portion of said spring cap.

* * * * *